United States Patent
Schlansker et al.

(10) Patent No.: US 11,126,564 B2
(45) Date of Patent: Sep. 21, 2021

(54) PARTIALLY COHERENT MEMORY TRANSFER

(71) Applicant: HEWLETT PACKARD ENTERPRISE DEVELOPMENT LP, Houston, TX (US)

(72) Inventors: Mike Schlansker, Palo Alto, CA (US); Jean Tourrilhes, Palo Alto, CA (US)

(73) Assignee: Hewlett Packard Enterprise Development LP, Houston, TX (US)

(*) Notice: Subject to any disclaimer, the term of this patent is extended or adjusted under 35 U.S.C. 154(b) by 0 days.

(21) Appl. No.: 16/069,282

(22) PCT Filed: Jan. 12, 2016

(86) PCT No.: PCT/US2016/013015
§ 371 (c)(1),
(2) Date: Jul. 11, 2018

(87) PCT Pub. No.: WO2017/123208
PCT Pub. Date: Jul. 20, 2017

(65) Prior Publication Data
US 2019/0026233 A1    Jan. 24, 2019

(51) Int. Cl.
*G06F 12/128* (2016.01)
*G06F 12/0831* (2016.01)
*G06F 12/0891* (2016.01)
*G06F 15/173* (2006.01)
*G06F 9/48* (2006.01)

(52) U.S. Cl.
CPC .......... *G06F 12/128* (2013.01); *G06F 9/4881* (2013.01); *G06F 12/0833* (2013.01); *G06F 12/0891* (2013.01); *G06F 15/173* (2013.01); *G06F 2212/254* (2013.01)

(58) Field of Classification Search
CPC ............... G06F 12/128; G06F 12/0833; G06F 12/0891; G06F 9/4881; G06F 15/173; G06F 2212/254
USPC ........................................................ 711/122
See application file for complete search history.

(56) References Cited

U.S. PATENT DOCUMENTS

| | | | |
|---|---|---|---|
| 6,751,705 B1 * | 6/2004 | Solomon | G06F 12/0811 711/120 |
| 6,944,719 B2 | 9/2005 | Rowlands et al. | |
| 8,131,941 B2 * | 3/2012 | Kinter | G06F 12/0831 711/141 |
| 8,244,825 B2 * | 8/2012 | Subramanian | H04L 69/40 709/212 |
| 8,250,311 B2 | 8/2012 | Beers et al. | |

(Continued)

OTHER PUBLICATIONS

International Search Report & Written Opinion received in PCT Application No. PCT/US2016/013015, dated Sep. 29, 2016, 11 pages.

(Continued)

*Primary Examiner* — William E. Baughman
(74) *Attorney, Agent, or Firm* — Park, Vaughan, Fleming & Dowler LLP

(57) ABSTRACT

Some examples described herein provide for a partially coherent memory transfer. An example method includes moving data directly from a coherence domain of an originating symmetric multiprocessor (SMP) node across a memory fabric to a target location for the data within a coherence domain of a receiving SMP node.

19 Claims, 7 Drawing Sheets

(56) References Cited

U.S. PATENT DOCUMENTS

| | | |
|---|---|---|
| 8,719,547 B2 | 5/2014 | Chinya et al. |
| 9,542,316 B1* | 1/2017 | Forrest ................ G06F 12/0815 |
| 9,648,102 B1* | 5/2017 | Davis ................ H04L 67/1097 |
| 2004/0210693 A1* | 10/2004 | Zeitler ................ G06F 12/0815 |
| | | 710/100 |
| 2005/0160230 A1 | 7/2005 | Doren et al. |
| 2005/0198187 A1 | 9/2005 | Tierney et al. |
| 2006/0236037 A1* | 10/2006 | Guthrie ............... G06F 12/0811 |
| | | 711/141 |
| 2008/0133841 A1 | 6/2008 | Finkler |
| 2015/0026432 A1 | 1/2015 | Borkenhagen et al. |
| 2015/0186215 A1 | 7/2015 | Das et al. |
| 2016/0092362 A1* | 3/2016 | Barron ................ G06F 12/0813 |
| | | 710/308 |
| 2016/0147659 A1* | 5/2016 | Drapala ............. G06F 12/0815 |
| | | 711/141 |

OTHER PUBLICATIONS

Schulz, M. et al., "Improving the Scalability of Shared Memory Systems Through Relaxed Consistency," Jun. 12, 2002, 10 pages, http://citeseerx.ist.psu.edu/viewdoc/download?doi=10.1.1.8.5649&rep=rep1&type=pdf.

\* cited by examiner

PARTIALLY COHERENT MEMORY TRANSFER

BACKGROUND

When shared memory is scaled to support a very large number of processors, significant benefits may be achieved. Large-scale shared memory architectures offer the potential for fine-grained data sharing across very large systems that are difficult with a traditional cluster computer using fast networks such as Ethernet or InfiniBand. For example, shared memory architectures, can exploit benefits of emerging word-addressable non-volatile storage memory and can efficiently share persistent data across hundreds or thousands of processors.

DESCRIPTION OF THE DRAWINGS

Certain examples are described in the following detailed description and in reference to the drawings, in which.

DETAILED DESCRIPTION

Figure 1:
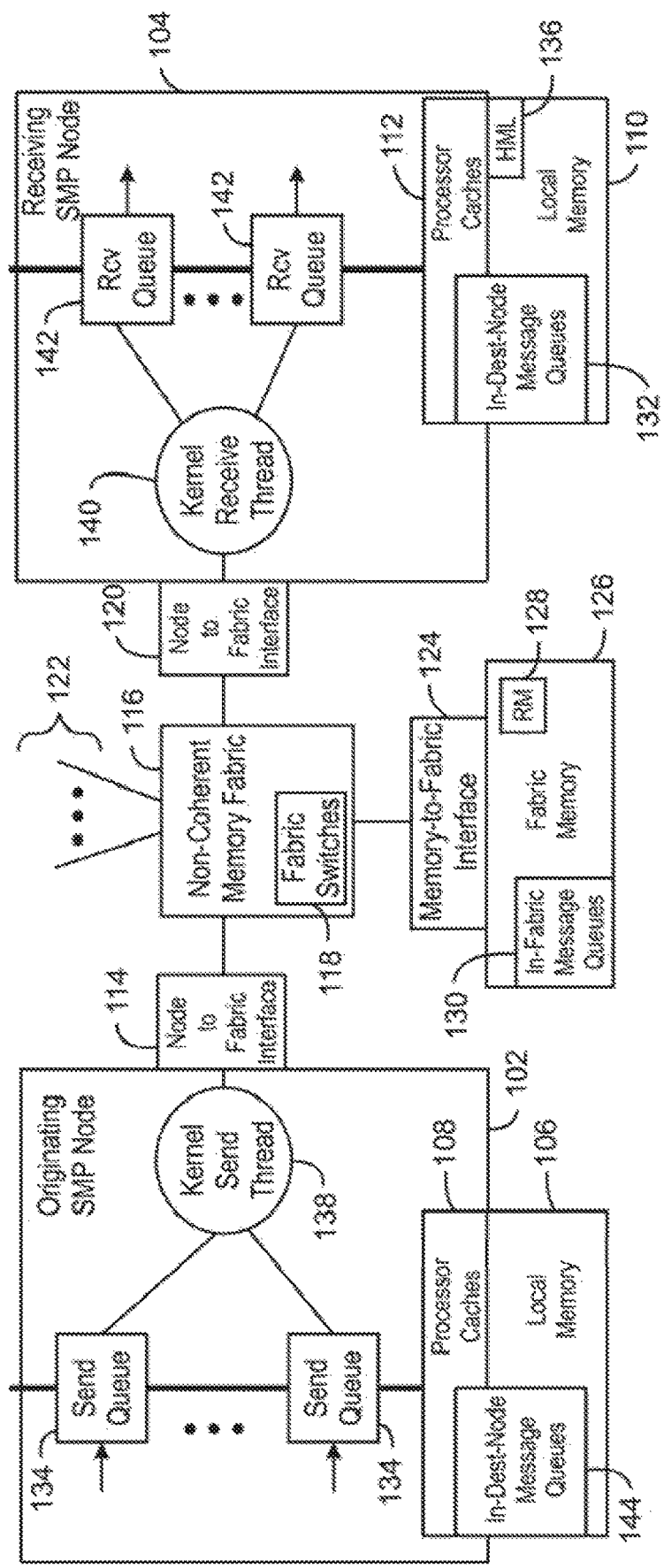
FIG. 1 is a schematic example of a system that can perform a partially coherent memory transfer.

Certain hardware architectures may share memory between processors. In these architectures a large number of processors may share memory to support efficient and flexible inter-process communication. At smaller scales, shared memory is mature technology that is used within popular multi-core processor chips from multiple hardware vendors. These shared memory multiprocessors are often single chip devices that incorporate one or more caches, which support cache coherent load and store operations, executed by the multiple processors. In many systems, cache coherent multiprocessors can be scaled to a few processor chips each containing multiple cores.

However, potential benefits for large-scale shared memory may be more difficult to achieve, due to a lack of coherence across a memory fabric. As used herein, coherence refers to the consistency of shared data across multiple clients, such as processors, processor cores, or node. A memory fabric refers to a group of computing nodes, such as symmetrical multiprocessor (SMP) systems, that are communicatively coupled by high bandwidth interconnects to provide unified computing systems. Each of the SMP nodes maintains coherency among the caches and memory for the various processors within that SMP node. Thus, as used herein, the cache and memory in a particular SMP system is considered to be within that system's coherence domain. Further, a cache may be referred to as a queue herein, as items may be written and removed in a time sequence. Thus, a queue may receive the data written from another location.

Previous shared memory architectures have shown that achieving memory coherence across a large memory fabric may introduce performance limitations. For example, providing large-scale cache coherence using snooping or distributed cache directories may use complex cache management protocols to send messages to invalidate or update copies of cached data whenever new data is written.

The use of non-coherent shared memory allows the use of simpler hardware, which is easier to scale. However, in non-coherent shared systems, inter-processor communication has to be programmed in software. For example, a store operation executed within one compute node may not be visible to load operations that reference the same memory location from another non-coherent node, unless explicit cache operations are executed to enforce the flow of data from a cache in one node through main memory and to a cache in the other node. This may create substantial traffic across a memory fabric, lowering the efficiency of the fabric.

In examples described herein, the excess traffic that is generated when a receiver polls an empty message queue may be reduced by locating a target location for data from an originating SMP node within the coherence domain of the receiving SMP node. To implement this function the memory addresses that are within the coherence domain of an SMP node, e.g., the local memory, may be made visible to other SMP nodes over the non-coherent memory fabric. A memory fabric allows for such operation, if the node-to-fabric interface of each SMP node can be the target of memory requests, in addition to being an originator of memory requests. This means that the local memory of the SMP node may be mapped into the global memory address space. An incoming memory request received by the node-to-fabric interface of a SMP node is translated to a memory request on the local memory at the corresponding address.

Other implementations are also possible, such as a messaging implementation in which message is sent as one or more write operations from the sending SMP node on the receiving SMP node. Upon receipt of the message, the receiving node may use header information to determine a target location for the data, such as a memory address.

FIG. 1 is a schematic example of a system 100 that can perform a partially coherent memory transfer. When computations are executed in parallel, work is divided among processes or threads that execute on many processors, for example, across processing cores within a single SMP 102 or across multiple SMP nodes 102 or 104. Parallel systems have been constructed with cooperating processes that use messaging to exchange data. With messaging, a message that is deposited in a send queue at a source processor is moved to and appears in a receive queue in a destination processor. Messaging is often implemented using networks such as Ethernet or InfiniBand that communicate between processors.

In the example of FIG. 1, a multiple node non-coherent system 100 incorporates multiple coherent shared memory multiprocessor (SMP) nodes, e.g., an originating SMP node 102 and a receiving SMP node 104. It can be noted that the originating and receiving SMP nodes 102 and 104 may be reversed for other data transfers, e.g., when data is being transferred from the receiving SMP node 104 to the originating SMP node 102.

Figure 2A:
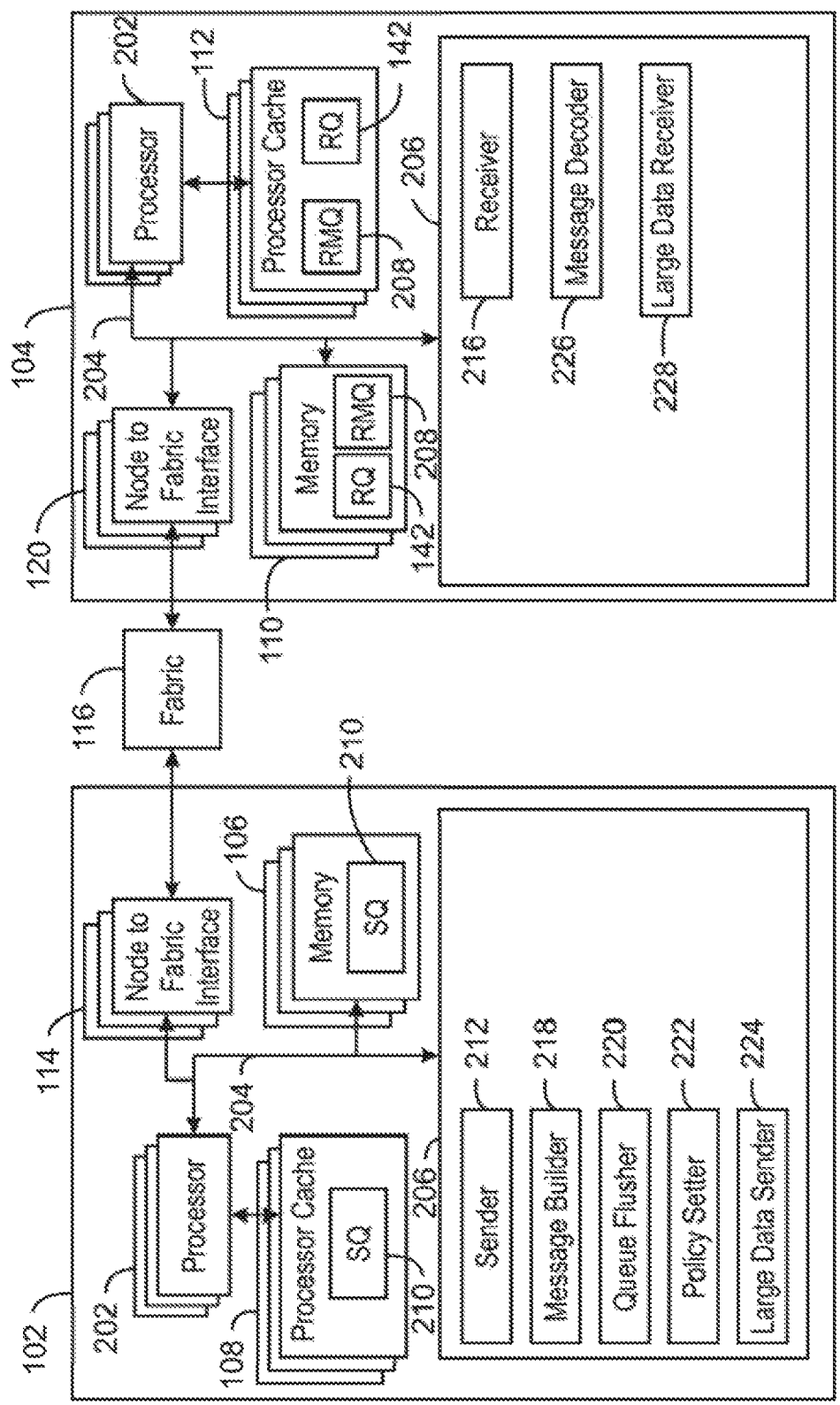
FIG. 2A is a schematic example of a system for implementing a partially coherent memory transfer.

Focusing first on the originating SMP node 102, multiple processors, or cores, may be present and share memory 106, as described further with respect to FIG. 2A. Each of the processors may have a processor cache 108 for storing frequently accessed data. The processors may read and write to the memory 106 using a locally-coherent cache system that maintains consistency between shared memory 106 and local processor caches 108, e.g., reads and writes within the coherence domain of the SMP node 102.

For example, such cache coherence techniques may include snooping and other distributed cache protocols. After a processor within the originating SMP node 102 performs a write to the memory 106 at a given memory location, any other processor in the originating SMP node 102 can read that memory location and will receive the current value. With cache-coherence logic, the value will be correct even if more than one processor cache 108 is used to speed up processing for the multiple SMP processors. When a location in the memory 106 that is cached is written, any copies of that location that may lie in multiple processor caches 108 are either invalidated or updated to the latest value. Thus, a subsequent read of that location will be forced to read a correct and up-to-date value from some processor cache 108 or from the memory 106. Similarly the receiving SMP node 104 may also have multiple processors or cores that share a memory 110. The processors may each have associated processor caches 112.

In FIG. 1, the coherent SMP multiprocessor nodes 102 and 104 are linked through a memory fabric to form the multiple node non-coherent system 100. For example, a node-to-fabric interface 114 on the originating SMP node 102 is coupled to a non-coherent memory fabric 116. The non-coherent memory fabric 116 includes a network of switches 118 that can route memory load and store traffic between the nodes of the multiple node non-coherent system 100. The switches 118 may couple the non-coherent memory fabric 116 to a node-to-fabric interface 120 that is coupled to the receiving SMP node 104. The non-coherent memory fabric 116 may also couple any number of other units in the multiple node non-coherent system 100. For example, a number of other SMP nodes 122 may be included.

Further, the non-coherent memory fabric 116 may couple to a memory-to-fabric interface 124 that couples to a fabric memory 126. Each memory location is accessed using a physical memory address. When a memory request is processed by the fabric, fabric hardware uses the physical address to route the memory request to a unique remote memory location for that physical address. The remote memory location may be in an SMP node, such as the receiving SMP node 104, or in the fabric memory 126.

Non-Coherent Messaging and Data Transfers

When a processor in a node, such as the receiving SMP node 104, accesses a value that is stored in a processor cache 112, or it accesses a value that is stored in the node's memory 110, then the value is accessed locally, and no communication takes place through the node-to-fabric interface 120. However, a processor may request access to a value in a location that is outside the receiving SMP node 104, such as remote memory location (RM) 128. The memory access causes a memory request to be routed through the node-to-fabric interface 120, outside the receiving SMP node 104, and across the non-coherent memory fabric 116 to the fabric memory 126, which holds the addressed RM 128. If the operation was a read, the value of the RM 128 location is returned through the non-coherent memory fabric 116 and stored locally, for example, in a processor cache 112.

While memory-coherence is preserved among processors that execute within a coherence domain for a single SMP node, such as the receiving SMP node 104, coherence is not preserved across the non-coherent memory fabric 116. The home memory location of a memory address, such as RM 128, is not implicitly synchronized with the various cached versions in SMP nodes, which may have different values depending on how caches are managed by the software.

As an example, a processor within the originating SMP node 102 may attempt to store a value to RM 128 in the fabric memory 126. However, the originating SMP node 102 may place the value in a local processor cache 108, without updating the RM 128 in the non-coherent memory fabric 116, e.g., not performing a write-back. If a processor on another node, such as the receiving SMP node 104 reads from the RM 128, it will get the old value, as the updated value is present only in the cache of the originating SMP node 102.

A push operation may be used to cause the cached data to be written back to its home memory location, e.g., RM 128. This may be implemented using a cache flush operation to push a cached entry at a specific memory address location back to its home memory location and then an invalidate operation so that the cache entry can be reused. A push also appears as a component of a write-through memory operation. A push operation pushes any possible in-cache value back to its home memory location. By using a push operation, the storing node can ensure that the home memory location is updated outside of the sending node. As used herein, a push operation may include any sequence of operations, such as write, write back, and the like, that move the data under the control of the originating SMP node 102. Similarly, a pull operation may include any sequence of operations that move the data under the control of the receiving SMP node 104.

Similarly, when the RM 128 location is read by a processor within another node, such as the receiving SMP node 104, if that processor had previously accessed RM 128, a prior value for this location may be present in a local processor cache 112. Accordingly, the value that is loaded from the processor cache 112 may not be the same as the value that was stored in the RM 128 location. Thus, the reading processor may load an incorrect value. To prevent this, the reading processor executes a cache invalidate operation before reading the data from RM 128 in the fabric memory 126.

These problems arise because the non-coherent memory fabric 116 uses a simplified design that does not provide fabric-wide cache coherence. When messaging is implemented on a shared memory system, message queues can be implemented to hold message data that has been sent but not yet received. In this simple approach the message queues 130 are located inside the fabric memory 126, and outside of any of the SMP nodes 102, 104, or 122.

Accordingly, to send a message while making sure the correct values are maintained across the nodes, the originating SMP node 102 may execute a non-coherent read of a value in the message queues 130 in the fabric memory 126, by performing a cache invalidate operation and a load operation. The invalidate operation makes sure that any cached result from a previous read is discarded. After the invalidate operation, a subsequent load operation to the same address misses in the node's local cache and the load is directed to the desired message queue 130 in the fabric memory 126.

A non-coherent write to the message queue 130 may then be performed by a write and push operation, e.g., a write through, from the originating SMP node 102 to address locations that reside in the message queue 130. The write operation updates the current value in the processor cache 108 in the originating SMP node 102.

To receive a message, the receiving SMP node 104 queries the message queue 130 to see if it is empty. If the message queue 130 is not empty, the receiving SMP node 104 locates and reads the oldest unread message. Reading the non-coherent queue is performed using invalidate and read operations to ensure that data is read remotely from the message queue 130 in the fabric memory 126. Similar non-coherent read operations are used to identify the location of the head entry of the message queue 130 and to read the actual message data from the head entry. Non-coherent write operations that store and push data are used to update the message queue 130 to remove its head entry.

If the message queue 130 is empty, the receiving processor may poll the message queue 130 while awaiting the arrival of a new message. Each iteration of the polling loop may execute one or more non-coherent read operations until it can be determined that the number of entries in the message queue 130 is not zero. When no messages are sent from the originating SMP node 102, the polling can cause a stream of non-coherent invalidate and read operations which force a memory request from the reading processor through the non-coherent memory fabric 116 to the fabric memory 126 that holds the message queue 130. Polling is wasteful of fabric bandwidth when no messages are sent.

An additional limitation of the simple non-coherent messaging described above is that all message data first passes from the originating SMP node 102 though the non-coherent memory fabric 116 and to a message queue 130 in fabric memory 126 and then from fabric memory 126 through the non-coherent memory fabric 116 to the receiving SMP node 104. This increases the traffic on the non-coherent memory fabric 116 as well as causing unnecessary stores to and from the fabric memory 126 which is slower than local memory 110 and processor caches 112.

In some non-coherent messaging operations, the home memory location, e.g., RM 128, may be present in the fabric memory 126. However, similar operations will be needed to avoid invalid data from being accesses.

Partially Coherent Messaging System

The problems described above can be alleviated using a partially-coherent messaging system as described herein. To implement the system, a target location address identifies a location within the local memory of a receiving processor in the receiving SMP node 104. For example, an in-destination message queue 132, or buffer, may be implemented within the receiving SMP node 104.

Any number of techniques may then be used to move data directly from a coherence domain of the originating SMP node 102 across the non-coherent memory fabric 116 to the target location for the data within a coherence domain of the receiving SMP node 104. For example, a process, in the originating SMP node 102 may directly create and write data to a memory location within the receiving SMP node 104. A push operation or a flush and clear operation may then be used to force the data out of a processor cache 108 in the originating SMP node 102, across the non-coherent memory fabric 116, to the receiving SMP node 104, and to the memory location 136. In some examples, a pointer to a location of the data in the originating SMP node 102 may be written or calculated within the receiving SMP node 104, which may then read the data from the addresses in the pointer. As used herein, the term move encompasses both writes performed from the originating SMP node 102 and reads performed from the receiving SMP node 104.

Further, the data may be moved to a location in a processor cache 112 in the receiving SMP node 104, which can be marked as dirty to enable subsequent reads directly from cache 112 and to ensure that data is written back to local memory 110 in the receiving SMP node 104 if the data cache line is evicted. In some examples, the data may be moved directly to locations in the local memory 110 in the receiving SMP node 104. In this case any corresponding prior cache entry is invalidated to ensure that subsequent reads of this data are taken from local memory 110 and not from cache. This type of move may be useful in cases in which the size of the data being moved is large, for example, greater in size than the size of cache in the receiving SMP node 104. As used herein, dirty indicates that the memory corresponding to the cache does not contain valid data.

In one example, when a sender, such as a processor in the originating SMP node 102, updates a send queue 134, a kernel send thread 138 may be responsible for pushing that update out of a local processor cache 108. Updated data may be forced toward a home memory location (HML) 136, within the memory 110 of the receiving SMP node 104, e.g., within the coherence domain of the receiving SMP node 104. The data will be routed out of the originating SMP node 102 through the non-coherent memory fabric 116 and into the receiving SMP node 104. Once received, it may pass to the home memory location 136, or into a processor cache 112 within the coherence domain of the receiving SMP node 104. For example, a kernel receive thread 140 may access a receive buffer in the in-destination node message queue 132 and place the data in the correct memory location or receive queue 142 for a target process.

Once the received data has been written to the memory 110 of the receiving SMP node 104, any coherent or non-coherent message polling or message reading of the delivered data will be local to the receiving node and its local memory. Thus, the receive queue 132 accesses will not generate memory accesses across the non-coherent memory fabric 116.

As described herein, the message flow may be bidirectional, e.g., the receiving SMP node 104 may function as an originating node for some data. Accordingly, the originating SMP node 102 will have similar blocks to the receiving SMP node 104, such as an in destination node messaging queue 144.

FIG. 2A is a schematic example of a system 200 for implementing a partially coherent memory transfer. Like numbered items are as described with respect to FIG. 1. Each of the SMP nodes 102, 104, and 122 described with respect to FIG. 1 may include any number of components. For example, the SMP nodes 102, 104, and 122 may include a processing resource, e.g., processor 202, that is to execute stored instructions, as well as the memory 106 or 110 that stores instructions that are executable by the processors 202 and data used by threads running on the processors 202. The processors 202 can be a single core processor, a dual-core processor, a multi-core processor, a number of processors, a computing cluster, a cloud server, or the like. For example, the processors 202 may be a symmetrical multiprocessor (SMP) core, wherein each core is linked by a high performance interconnect to a processor cache 108 and 112, respectively. The processor caches 108 and 112 may include level 2 or level 3 caches that are interlinked, by coherence protocols.

The processors 202 may be coupled to the memory 106 or 110 by data buses 204 where the data buses 204 may be communication systems that transfer data between various components of the SMP nodes 102, 104, and 122. In examples, the data buses 204 may include a Peripheral Component Interconnect (PCI) bus, an Industry Standard Architecture (ISA) bus, a PCI Express (PCIe) bus, and high performance links, such as the Intel® direct media interface (DMI) system, QuickPath Interconnects, Hyper-Transport, DDR and the like.

The memory 106 or 110 may include random access memory (RAM), e.g., static RAM (SRAM), dynamic RAM (DRAM), zero capacitor RAM, embedded DRAM (eDRAM), extended data out RAM (EDO RAM), double data rate RAM (DDR RAM), nonvolatile RAM (NVRAM), resistive RAM (RRAM), parameter RAM (PRAM), and non-volatile RAM (NVRAM). Other types of memory 106 that may be used include read only memory (ROM), e.g., mask ROM, programmable ROM (PROM), erasable programmable ROM (EPROM), and electrically erasable programmable ROM (EEPROM), flash memory, or any other suitable memory systems.

The SMP nodes 102, 104, and 122 may each include a storage device 206. The storage devices 206 may include non-volatile storage devices, such as a solid-state drive, a hard drive, a tape drive, an optical drive, a flash drive, an array of drives, a storage attached network (SAN), or any combinations thereof in some examples, the storage device 206 may include non-volatile memory, such as non-volatile RAM (NVRAM), battery backed up DRAM, and the like. In some examples, the memory 106 or 110 and the storage device 206 in an SMP node 102 or 104 may be a single unit, e.g., with a contiguous address space accessible by the processors 202.

With the features describe herein, a computer-to-computer messaging system may send messages across a non-coherent memory fabric 116, while minimizing the number of memory accesses needed for activities, such as polling a receive message queue 208, or a queue dedicated to a particular process, such as a receive queue 142, querying a status of the queue 208 or 142, and actual message data transport. As shown in FIG. 2A, the receive message queue 208 may exist in the receiving SMP node 104 in the memory 110, the processor cache 112, or both. Send queues 210 in the originating SMP node 102 may be used to hold data that is to be transmitted to receive message queues 208 in the receiving SMP node 104.

As for the receive message queues 208, the send queues 210 may exist in the originating SMP node 102 in the memory 106, the processor cache 108, or both. This data transfer may be performed by atopy, push, or write-back operation across the non-coherent memory fabric 116, among others. In some examples, the transmission may be directly from a send queue 210 or a process in a processor cache 108 to a receive queue 208 in a processor cache 112 without requiring any accesses to memory 106 or 110. Large data transfers, e.g., greater than a cache block size, may be performed from a send queue 210 in the memory 106 of the originating SMP node 102 to the receive queue 208 in the memory 110 of the receiving SMP node 104.

The storage device 206 may include a number of units to provide the SMP nodes 102, 104, or 122 with the messaging functionalities described herein. A sender 212 may be responsible for moving data from the originating SMP node 102 to the receiving SMP node 104. The sender 212 may be a process or circuitry that directly maps the target location in the receiving SMP node 104 for processes in the originating SMP node 102. In this example, the sender 212 may handle all actions used in the originating SMP node 102 to implement a user-to-user transfer of data from the originating SMP node 102 to the receiving SMP node 104. Accordingly, a process may directly write to a memory address, and the sender 212 may implement the write or push operations.

In some examples, the sender 212 may be a kernel sender that is responsible for the input polling of send queues 210 to identify messages to send across the non-coherent memory fabric 116. For common write-back memory operations, sending users may update send queues 210 in the processor caches 108 without updating memory 106. For example, if a user process has computed data recently and that data that is deposited into a send queue 210 then that data is likely to be present in the processor cache 108 of the originating SMP node 102. As polling of the send queues 210 takes place within the originating SMP node 102, it can operate within the processor cache 108.

The kernel sender may then be responsible for sending messages, across the non-coherent memory fabric 116, from one of many send ports. Each message may be sent to the receive message queue 208 in one of many receiving SMP nodes 104. The kernel sender polls each send queue 210 to see whether a new message is ready to be sent. When a send message is identified, the message's destination node is identified and the kernel sender may copy and write the message to the remote message queue 208 inside the receiving SMP node 104. In some examples, the receive message queue 208 is dedicated to a user process and that user process implements receiver 216.

A receiver 216 may be implemented in the receiving SMP node 104 for moving data from the originating SMP node 102. For example, the receiver 216 may work with the sender 212 to implement a user-to-user transfer that is transparent to the processes that originate and consume the data. In these examples, the sender 212 and receiver 216 may perform all steps used to ensure that the data is written from any cache locations to the correct memory locations, and the like. In some examples, the receiver 216 may scan the remote message queue 208 in the receiving SMP node 104 for pointers, indicating that data is ready to be moved from the originating SMP node 102. The receiver 216 may then read the data from the location in the originating SMP node 102.

When remote write requests to update the remote message queue 208 pass through the node-to-fabric interface 120 of the receiving SMP node 104, a write-back operation can be used to place data in the remote message queue 208 in the processor cache 112. As described, the remote message queue 208 may be implemented as a circular buffer, and may reside in the processor cache 112 of the receiving SMP node 104. In some examples, the kernel receiver can provide the data to a receive queue 142 for a user process. If the message is already in the cache, no access to the memory 110 is needed. If newly computed data is sent repeatedly across a non-coherent memory fabric 116, then all of these operations can be performed in the processor cache 112 and without writing to memory 110.

Other blocks may be used to provide further functions. For example, a message builder 218 may be used by the sender 212 to construct a message, including, for example, a header that may include a target node or memory location, a data length, and a data block to be moved to the target location. A queue flusher 220 may be used to confirm that the data in the processor cache 108 or the memory 106 is the most current copy before it is moved, and to release the send queue 210 after an acknowledgement of receipt is obtained from the receiving SMP node 104.

A policy setter 222 may select different messaging techniques, depending on the amount of data to be moved. For example, a large amount of data, e.g., greater in size than a cache data page, may be more efficiently moved from the originating SMP node 102 directly to the memory 110 in the receiving SMP node 104. A large data sender 224 may be used to oversee the transfer of the data, for example, by issuing the copy commands used to transfer large amounts of data. If the large block transfer is a lower priority process, the large data sender 224 may be used to track the status of the transfer, and continue the transfer if it is interrupted by higher priority processes.

A number of blocks in the receiving SMP node 104 may be used to facilitate the transfer in addition to the receiver 216. This may include a message decoder 226, for example, used by the receiver 216 to determine a target location for a data block. A large data receiver 228 may be used in conjunction with the large data sender 224 to coordinate the movement of large amounts of data from the originating SMP node 102 to the memory 110 in the receiving SMP node 104, for example, by copying the data from the memory 106 in the originating SMP node 102.

The block diagram of FIG. 2A is not intended to indicate that the system 200 for partially coherent data transfers includes all the components shown in the figure. For example, the policy setter 222, the large data sender 224, and the large data receiver 228, among other blocks may not be used in some implementations, as shown in the example in FIG. 2B. Further, the blocks used to implement the functions may be different than shown in FIG. 2A. For example, the sender 212 and receiver 216 may incorporate many of the other functions in a common thread.

Figure 2B:
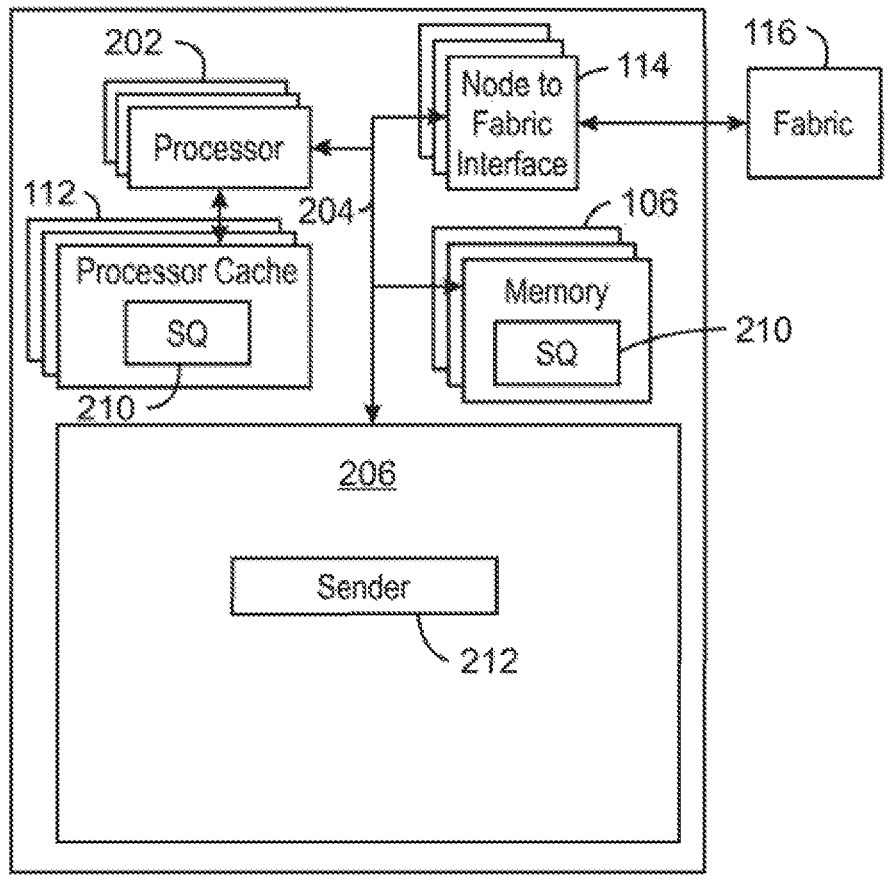
FIG. 2B is a schematic example of a system for implementing a partially coherent memory transfer.

FIG. 2B is a schematic example of a system 200 for implementing a partially coherent memory transfer. Like numbered items are as described with respect to FIGS. 1 and 2A. In a simple case, the functions described herein may be implemented by the kernel sender 212, which may be, an operational thread running in the memory 106.

Figure 3A:
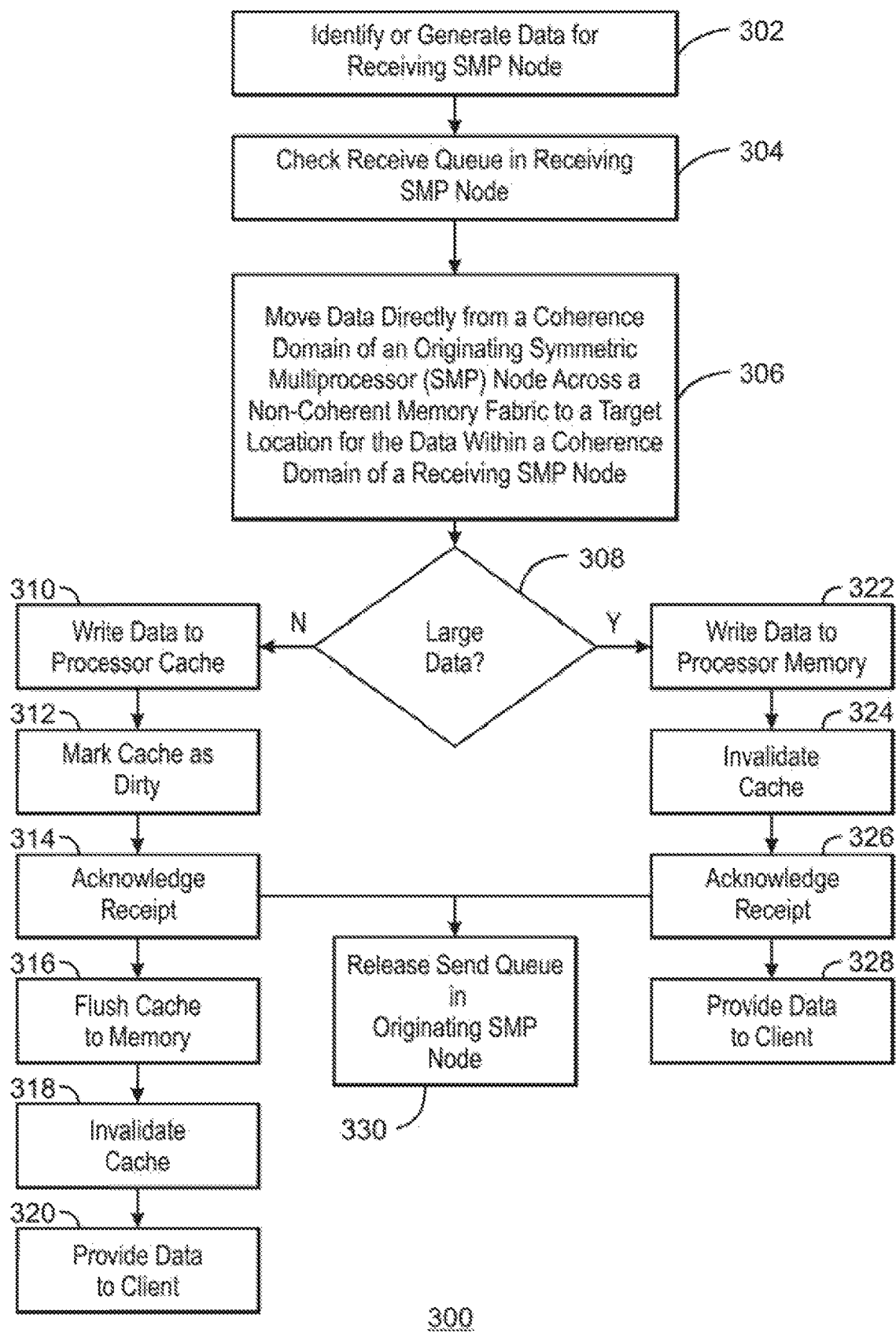
FIG. 3A is a process flow diagram of an example method for a partially coherent memory transfer.

FIG. 3A is a process flow diagram of an example method 300 for a partially coherent memory transfer. The method 300 starts at block 302 when data for a receiving SMP node is identified or generated.

To check whether a receive message buffer has available space, at block 304, a receive message queue in the receiving SMP node may be checked. A node-to-fabric interface may support read transactions that move read data from a cache in a receiving SMP node across a non-coherent memory fabric and back to the originating SMP node that issued the read operation. A processor within the originating SMP node executes an invalidate cache line operation and then executes a read operation that addresses a location within the local memory of the receiving SMP node. The invalidate operation ensures that no prior value for the requested data lies in the cache in the originating SMP node. As a result of the invalidation, the read operation misses in the local cache and is routed through the node-to-fabric interface and across the non-coherent memory fabric to the receiving SMP node, which holds the local memory containing the read address. The read access passes through the node-to-fabric interface for the receiving SMP node, where it directly accesses cached data, if present, or it accesses the local memory if the cache access misses. This read transaction is used to pull the queue status from the cache or the local memory of the receiving node.

This may allow the originating SMP node to efficiently query the status of a remote message queue, or a receive queue, without accessing the memory of the receiving SMP node. For example, the originating SMP node can test a remote queue's status to see if the queue is too full before depositing a new entry.

In some examples, the receiving SMP node pulls the data from the originating SMP node. After the originating SMP node writes data into a known source location in the local memory of the originating node, a receiving node can pull that data by first invalidating a cache line at the source location and then by reading that source location. This causes the read request to miss in the receiving node's cache and to be routed across the non-coherent fabric to the originating node where the data is accessed as a remote read request and returned across the fabric to the receiving node. Data can be read from the source location either in the cache of the originating node, if present, or in the local memory of the originating node. That may include write operations from the originating SMP node, or read operations from the receiving node.

At block 306, the data may be moved directly from a coherence domain of an originating symmetric multiprocessor (SMP) node across a memory fabric to a target location for the data within a coherence domain of a receiving SMP node. This may be performed using any number of techniques that may include push (write) operations from the originating SMP node, or pull (read) operations from the receiving SMP node. For example, a sending processor in the originating SMP node may perform a write-push-and-flush data to, the receive message queue in the memory of the receiving SMP node. The write and push ensures that message data is actually sent out of the originating SMP node and to the receiving SMP node as described above. The flush may be used by the sending processor when the data in the recently written message is no longer locally needed by the sender. Accordingly, the sender may flush the cache. The specific target for the data may be determined by the amount of data to be moved.

For example, at block 308, a policy determination may be made as to whether the data should be sent to a cache location or directly to a memory location. The determination may be made on the amount of the data to be moved, and may not be implemented in all examples. If at block 308, the determination is made to perform a cache to cache transfer, at block 310, a remote store request may enter the receiving SMP node through its node-to-fabric interface, and place the data into a remote message queue or receive queue in the receiving SMP node's cache, which is marked as dirty at block 312. As the store request updates the cache in the receiving SMP node without updating memory, marking the corresponding cache is as dirty may ensure that memory is updated before the cache is cleared. In some examples, write requests entering the receiving SMP node through the node-to-fabric interface can update both the cache entry and the corresponding memory location, e.g., using a write through operation. In this case, the written value may remain in the cache in the clean state because if the cache is cleared the memory location already holds the correct value. In either case, any local read of the addressed location (within the destination node) can produce the correct up-to-date value that was previously transferred across the fabric into the receiver's cache. At block 314, an acknowledgement of the receipt of the data may be returned, although this may not be performed in all examples.

At block 316, the cache may be flushed to memory. This may be performed by the kernel receive thread, or may be performed as part of the normal coherence maintenance in the receiving SMP node, such as cache eviction, and the like. Once the cache is flushed to memory, the data in the cache may not be needed anymore. Further, the value in memory may be overwritten from another cache. Accordingly, at block 318, the cache may be invalidated and released for use. At block 320, the data may be written from a remote, message queue, or other receive buffer, to a receive queue for a target process, for example, if the data has not already been written to a memory or cache location dedicated to the target process.

If at block 308, it is determined that data should be written directly to memory, for example, for larger amounts of data that may not fit in a single cache page, process flow proceeds to block 322. At block 322, the data is moved to a target location in the memory of the receiving SMP node. At block 324, any associated caches, e.g., holding a prior value from a memory location in the transferred range, are invalidated. This helps to ensure that any subsequent read operation that is processed within the receiving SMP node would miss in the cache and return the correct value from memory. Further, a correct value would be returned for all reads that are executed on any processor that is local to the receiving SMP node. A correct value would also be returned for any remote reads that enter the receiving SMP node through the node-to-fabric interface. At block 326, an acknowledgement may be sent to the originating SMP node, for example, to indicate that a large data transfer is complete, although this may not be performed in all examples. At block 328, the data is provided to the client. Although data in a send queue, or other message buffer, may be released as soon as the data is sent, in some examples, the data may be held until an acknowledgement is received from the receiving SMP node, as shown in block 330.

The method 300 is not limited to the blocks shown in process flow diagram of FIG. 3A. In some examples, blocks may be combined or omitted, depending on the system. For example, an acknowledgement may not be sent, as shown in blocks 312 and 324. In these examples, a send queue may be released without waiting for a specific acknowledgment. Further, the use of policies to determine the types of transfers may not be needed. For example, transfers may be limited to cache to cache, cache to memory, and the like. This is further described with respect to FIG. 3B.

Figure 3B:
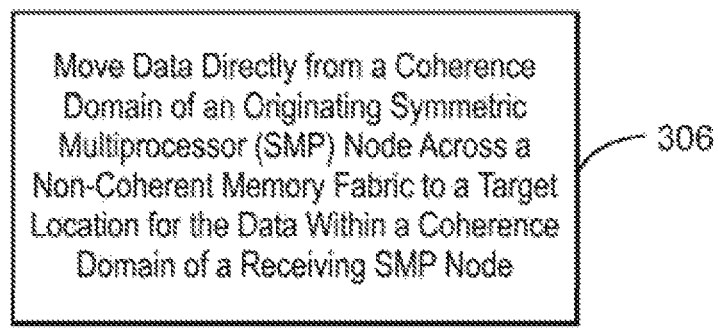
FIG. 3B is a process flow diagram of an example method for a partially coherent memory transfer.

FIG. 3B is a process flow diagram of an example method 300 for a partially coherent memory transfer. Like numbered items are as described with respect to FIG. 3A.

Figure 4A:
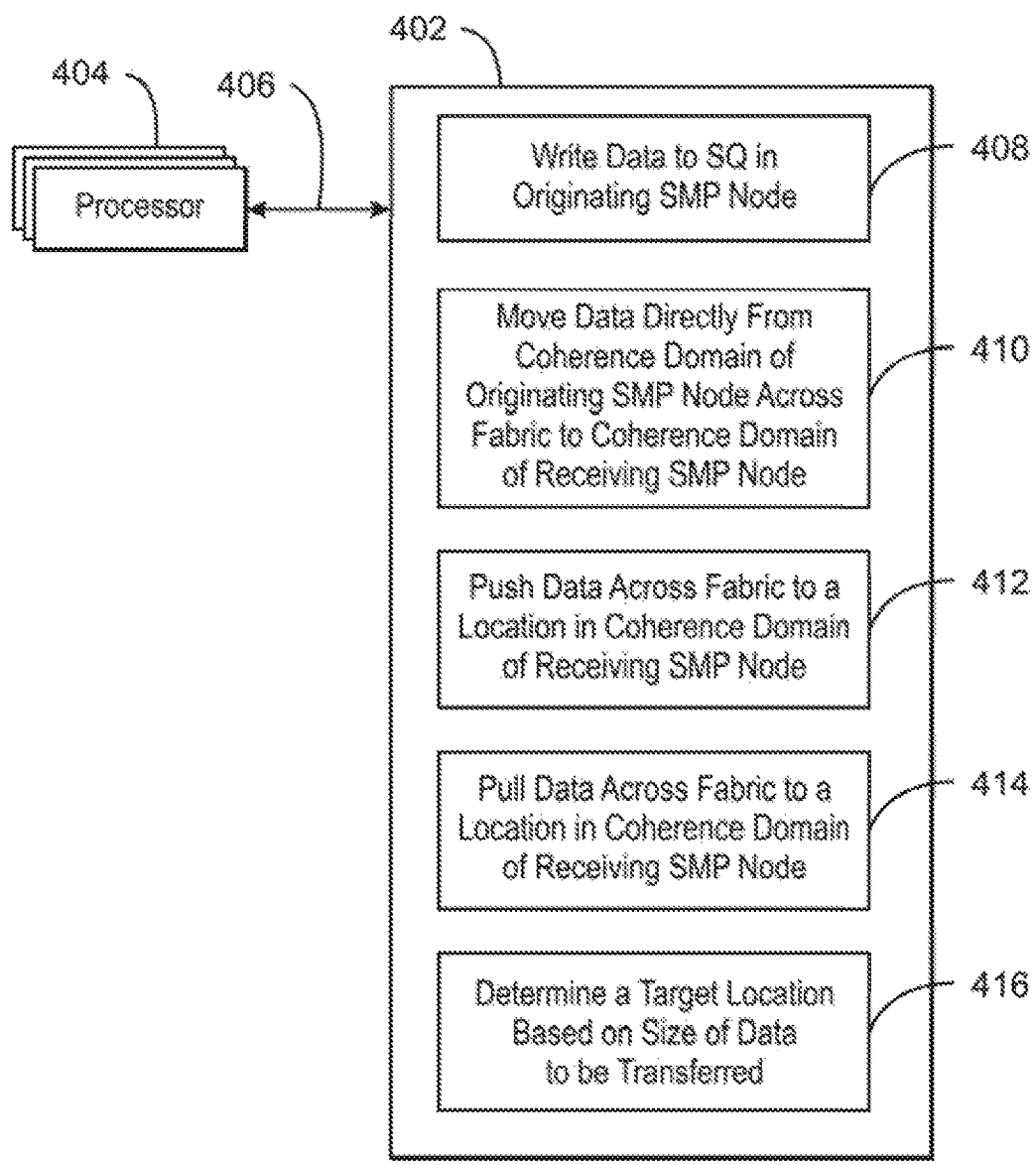
FIG. 4A is a block diagram of an example memory resource storing non-transitory, machine readable instructions comprising code to direct one or more processing resources to perform a partially coherent memory transfer.

FIG. 4A is a block diagram 400 of an example memory resource 402 storing non-transitory, machine readable instructions comprising code to direct one or more processing resources 404 to perform a partially coherent memory transfer. The memory resource may be a memory, a storage unit, or any other unit that can store or run code. The processing resources 404 may be processors in an originating SMP node, a receiving SMP node, or both, that can access the memory resource 402 over a bus 406 or memory fabric, for example, as described with respect to FIG. 2A.

The memory resource 402 may include code 408 to direct a processing resource 404 to write data to a send queue, or other message buffer, in an originating SMP node. Code 410 may be included to direct a processing resource 404 to move data directly from a coherence domain in an originating symmetric multiprocessor (SMP) node across a non-coherent memory fabric to a location within a coherence domain for a receiving SMP node. Code 412 may be included to push data out of the originating SMP node to a location in a coherence domain of a receiving SMP node over a non-coherent memory fabric. Code 414 may be included to pull data out of the originating SMP node to a location in a coherence domain of a receiving SMP node over a non-coherent memory fabric. The memory resource 402 may also include code 416 to direct the processing resource 404 to determine a target location based on the size of the data to be transferred. For example, large blocks of data may be transferred in a memory to memory process, while smaller blocks of data may be transferred in a more efficient cache to cache transfer.

Not all of the code blocks shown in FIG. 4A may be used in all examples. In some implementations, fewer blocks may be used, or blocks may be combined in different ways than shown.

Figure 4B:
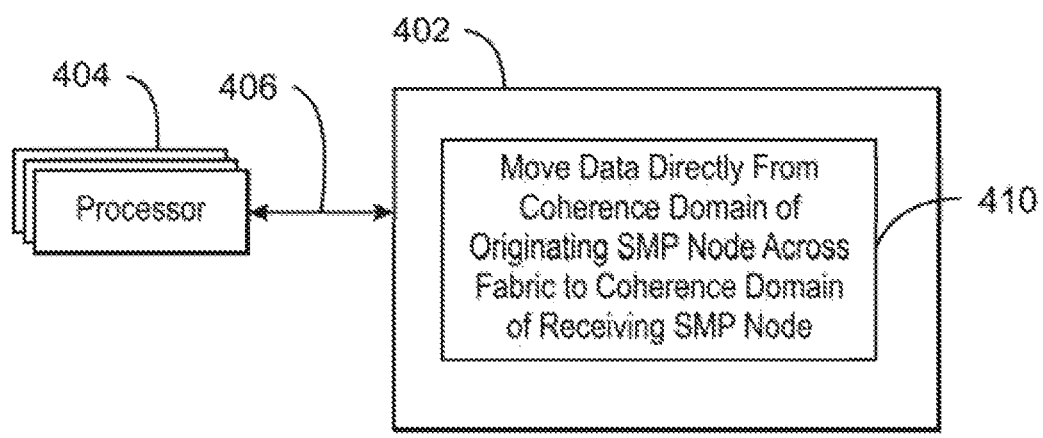
FIG. 4B is a block diagram of an example memory resource storing non-transitory, machine readable instructions comprising code to direct one or more processing resources to perform a partially coherent memory transfer.

FIG. 4B is a block diagram 400 of an example memory resource 402 storing non-transitory, machine readable instructions comprising code to direct one or more processing resources 404 to perform a partially coherent memory transfer. Like numbers are as described with respect to FIG. 4A. In this example, the code 410 directs the processing resource 404 to move data directly from a coherence domain in an originating symmetric multiprocessor (SMP) node across a non-coherent memory fabric to a location within a coherence domain for a receiving SMP node.

In some examples described herein, with a receive message queue located in the receiving SMP node, receive polling that occurs while a receiver waits for a new message is now performed by a processor which reads from a message queue that is located within its local memory. Each memory read that determines whether the receive queue remains empty is local to the receive node and need not generate any request that exits the node onto the fabric. When the remote write is directly to a cache in the receiving SMP node, the receiving processor may now hold portions of the receive message queue in a local, e.g., first or second-level cache. In this case, receive polling need not invalidate its cache entry before accessing the receive queue and need not access local memory while polling. Polling is now performed by repeatedly inspecting a cached copy of receive queue contents. Thus, the polling receive loop now operates from its cache and need not generate read accesses to local non-cached memory.

When a store request is routed toward the local memory that is attached to the receive node, the receiving node's local memory is updated with new message queue data and any previously cached value for the same location in the local processor caches is invalidated. The next iteration of a receiver polling loop misses in its cache and reloads the cache with up-to-date data from the local memory of the receive node. The polling loop detects that the queue is now not empty and reads the new message. After messages are read and removed, the queue returns to an empty state. Polling resumes and loads any referenced message queue state into processor caches so that the receiving processor resumes polling without memory access.

In addition, after reading and copying a message entry out of the receive queue, a receiver may execute operations to invalidate data associated with the message entry. The purpose of this invalidate is to signal to the processor that the just copied message entry is no longer needed, and to allow cache lines associated with recently copied message to be reused for any important future purpose. This serves to reduce the amount of cache space that is wasted by a partially coherent messaging system.

While the present techniques may be susceptible to various modifications and alternative forms, the exemplary examples discussed above have been shown only by way of example. It is, to be understood that the techniques are not intended to be limited to the particular examples disclosed herein. Indeed, the present techniques include all alternatives, modifications, and equivalents falling within the scope of the present techniques.

What is claimed is:

1. A method, comprising:
    updating a send queue, which is in a first coherence domain of a first symmetric multiprocessor (SMP) node, with a message comprising a pointer to a piece of data stored in a first memory device of the first SMP node, wherein a target location for the piece of data is within a second coherence domain of a second SMP node, wherein the target location corresponds to a second memory device of the second SMP node; and wherein a destination of the message includes a receive message queue of the second coherence domain; and
    writing, from the send queue, the message into the receive message queue via a non-coherent memory fabric without supporting fabric-wide cache coherency, thereby allowing the second SMP node to retrieve the piece of data into the target location based on the pointer.

2. The method of claim 1, further comprising pushing the piece of data out of a queue in the first SMP node.

3. The method of claim 1, further comprising pulling the piece of data from the first coherence domain into the target location.

4. The method of claim 1, further comprises:
    sending the piece of data to a cache location in the second SMP node; and
    marking the cache location as dirty.

5. The method of claim 4, further comprising:
    invalidating the cache location; and
    moving the piece of data to a memory location in the second SMP node.

6. The method of claim 1, further comprising determining a location in a cache or a memory of the second SMP node as the target location.

7. The method of claim 1, further comprising determining an amount of data to be moved to the second SMP node.

8. The method of claim 1, wherein the piece of data is copied from a receive queue of the second coherence domain to a memory location allocated to a target process.

9. A system, comprising:
    a first symmetric multiprocessor (SMP) node;
    a second SMP node; and
    a non-coherent memory fabric coupling the first and second SMP nodes, wherein the non-coherent memory fabric without supporting fabric-wide cache coherency;
    wherein the first SMP node, by issuing a sequence of processing operations, causes:
    updates to a send queue in a coherence domain of the first SMP node across, with a message comprising a pointer to a piece of data stored in a first memory device of the first SMP node, wherein a target location for the piece of data is within a second coherence domain of the second SMP node, wherein the target location corresponds to a second memory device of the second SMP node, and wherein a destination of the message includes a recieve message queue of the second coherence domain; and
    a write operation from the send queue for writing the message into the receive message queue via the non-coherent memory fabric, thereby allowing the second SMP node to retrieve the piece of data into the target location based on the pointer.

10. The system of claim 9, wherein the second SMP node comprises:
    a receive buffer configured to receive the piece of data from the first SMP node;
    a first node-to-fabric interface coupled to the non-coherent memory fabric; and
    a receiver to move the piece of data through the first node-to-fabric interface and across the non-coherent memory fabric based on the pointer.

11. The system of claim 9, wherein the first SMP node comprises:
    the send queue;
    a second node-to-fabric interface coupled to the non-coherent memory fabric; and
    a sender to move the piece of data from a location indicated by the pointer through the second node-to-fabric interface and across the non-coherent memory fabric to the target location.

12. A non-transitory memory resource storing instructions that when executed by a computer cause the computer to perform a method, the method comprising:
    updating a send queue, which is in a first coherence domain of a first symmetric multiprocessor (SMP) node, with a message comprising a pointer to a piece of data stored in a first memory device of the first SMP node, wherein a target location for the piece of data is within a second coherence domain of a second SMP node, wherein the target location corresponds to a second memory device of the second SMP node, and wherein destination of the message includes a receive message queue of the second coherence domain and
    writing, from the send queue, the message into the receive message queue via a non-coherent memory fabric without supporting fabric-wide cache coherency, thereby allowing the second SMP node to retrieve the piece of data into the target location based on the pointer.

13. The non-transitory memory resource of claim 12, wherein the method further comprises pushing the piece of data out of a queue in the first SMP node.

14. The non-transitory memory resource of claim 12, wherein
    the piece of data is copied from a receive queue of the second coherence domain to a memory location allocated to a target process.

15. The non-transitory memory resource of claim 12, wherein the method further comprises pulling the piece of data from the first coherence domain into the target location.

16. The non-transitory memory resource of claim 12, wherein the method further comprises:
    sending the piece of data to a cache location in the second SMP node; and
    marking the cache location as dirty.

17. The non-transitory memory resource of claim 16, wherein the method further comprises:
    invalidating the cache location; and
    moving the piece of data to a memory location in the second SMP node.

18. The non-transitory memory resource of claim 12, wherein the method further comprises determining a location in a cache or a memory of the second SMP node as the target location.

19. The non-transitory memory resource of claim 12, wherein the method further comprises determining an amount of data to be moved to the second SMP node.

* * * * *